(12) United States Patent
Mathai et al.

(10) Patent No.: US 10,564,335 B2
(45) Date of Patent: Feb. 18, 2020

(54) OVERMOLDED FILTERS

(71) Applicant: HEWLETT PACKARD ENTERPRISE DEVELOPMENT LP, Houston, TX (US)

(72) Inventors: Sagi Varghese Mathai, Palo Alto, CA (US); Paul Kessler Rosenberg, Palo Alto, CA (US); Michael Renne Ty Tan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 46 days.

(21) Appl. No.: 15/555,005

(22) PCT Filed: Apr. 10, 2015

(86) PCT No.: PCT/US2015/025266
§ 371 (c)(1),
(2) Date: Aug. 31, 2017

(87) PCT Pub. No.: WO2016/164035
PCT Pub. Date: Oct. 13, 2016

(65) Prior Publication Data
US 2018/0052266 A1 Feb. 22, 2018

(51) Int. Cl.
*G02B 5/28* (2006.01)
*G02B 5/20* (2006.01)
(Continued)

(52) U.S. Cl.
CPC .............. *G02B 5/288* (2013.01); *B29B 11/00* (2013.01); *B29C 45/14778* (2013.01);
(Continued)

(58) Field of Classification Search
CPC .......... G02B 5/285; G02B 5/201; G02B 5/28; G02B 5/284; G02B 26/001; G01J 3/51;
(Continued)

(56) References Cited

U.S. PATENT DOCUMENTS 4,235,654 A 11/1980 Dohi et al.
5,105,237 A 4/1992 Hasegawa et al.
(Continued)

FOREIGN PATENT DOCUMENTS

JP 11295517 A 10/1999
JP 2006039292 A 2/2006
(Continued)

OTHER PUBLICATIONS

International Search Report & Written Opinion received in PCT Application No. PCT/US2015/025266, dated Jan. 8, 2016, 12 pages.
(Continued)

*Primary Examiner* — William R Alexander
*Assistant Examiner* — Tamara Y. Washington
(74) *Attorney, Agent, or Firm* — Hewlett Packard Enterprise Patent Department

(57) ABSTRACT

In the examples provided herein, an apparatus has an optically transparent block having a filter surface. The apparatus also has two or more filters, where each of the filters has thin films fabricated on an optically transparent substrate, and further wherein the thin films of the filters are coupled to the filter surface. Additionally, the apparatus has an optically transparent overmold material encasing the two or more filters, where the overmold material fills a volume between and above neighboring ones of the two or more filters.

15 Claims, 11 Drawing Sheets

(51) Int. Cl.
- *G02B 6/293* (2006.01)
- *B29B 11/00* (2006.01)
- *B29C 45/14* (2006.01)
- *B29C 70/84* (2006.01)
- *B29D 11/00* (2006.01)
- *G02B 7/00* (2006.01)
- *B29K 105/20* (2006.01)
- *B29L 11/00* (2006.01)

(52) U.S. Cl.
CPC ........ *B29C 70/84* (2013.01); *B29D 11/00634* (2013.01); *G02B 5/201* (2013.01); *G02B 6/2938* (2013.01); *G02B 6/29367* (2013.01); *G02B 7/006* (2013.01); *B29K 2105/20* (2013.01); *B29K 2995/0026* (2013.01); *B29L 2011/0066* (2013.01)

(58) Field of Classification Search
CPC ........ G01J 3/26; G01J 3/02; G01J 3/36; G01J 3/0259
See application file for complete search history.

(56) References Cited

U.S. PATENT DOCUMENTS

| | | | |
|---|---|---|---|
| 6,652,161 | B2 | 11/2003 | Grann et al. |
| 6,733,190 | B2 | 5/2004 | Kuhara et al. |
| 6,937,786 | B2 | 8/2005 | Lemoff |
| 7,123,798 | B2 | 10/2006 | Fukuyama et al. |
| 2004/0057653 | A1 | 3/2004 | Fukuda et al. |
| 2014/0111875 | A1 | 4/2014 | Herard |
| 2018/0355149 | A1* | 12/2018 | Sasaki ............... C09B 53/02 |
| 2019/0003885 | A1* | 1/2019 | Smith ............... G01J 3/0208 |

FOREIGN PATENT DOCUMENTS

| | | |
|---|---|---|
| KR | 100668611 B1 | 1/2007 |
| TW | 200613788 A | 5/2006 |

OTHER PUBLICATIONS

Kim, D-J, et al., Thermal Characteristics of a Laser Diode Integrated on a Silica-terraced PLC Platform, Jun. 2005, ETRI Journal, vol. 27, No. 3, pp. 337-340.

* cited by examiner

OVERMOLDED FILTERS

CROSS REFERENCE TO RELATED APPLICATION

This application is a National Stage Entry under 35 U.S.C. § 371 of International Application No. PCT/US15/25266, the content of which is incorporated herein by reference in its entirety.

BACKGROUND

Electronic circuit boards can be overmolded with a hard thermoset material to provide durability and mechanical resistance to shock and vibration. Additionally, overmolding the circuit board provides moisture protection in the form of a hermetically sealed environment for the board.

BRIEF DESCRIPTION OF THE DRAWINGS

The accompanying drawings illustrate various examples of the principles described below. The examples and drawings are illustrative rather than limiting.

DETAILED DESCRIPTION

An example apparatus is presented below that includes an optically transparent block that has a surface, referred to as a filter surface, and two or more filters coupled to the filter surface. Each of the filters is a thin film filter that has thin films fabricated on an optically transparent substrate, and the thin films of the filters are coupled, directly or indirectly, to the filter surface of the optically transparent block. Additionally, an optically transparent overmold material encases the two or more filters and fills a volume between neighboring ones of the two or more filters. In some implementations, the overmold material may have a first surface and a second surface, where the first surface may contact the filter surface of the block, and the second surface may be away from the filter surface and molded to direct light entering or exiting the overmold material at a particular angle. Further, the apparatus may include an anti-reflection coating on the second surface.

In some implementations, the apparatus may include alignment features coupled to the overmold material to position the two or more filters in a first direction perpendicular to the filter surface and in a second direction perpendicular to the first direction. The alignment features may be part of the overmold material extending beyond the second surface, or may be fabricated by photolithography or electroplating on the overmold material.

In some implementations, the apparatus may include an optically transparent cap coupled to the filter surface of the block such that a cavity is formed between the cap and the block, where the overmold material fills the cavity and the two or more filters are encased by the overmold material within the cavity. A surface of the cap away from the block may include alignment features to position the two or more filters in a first direction perpendicular to the filter surface and in a second direction perpendicular to the first direction.

Figure 1A:
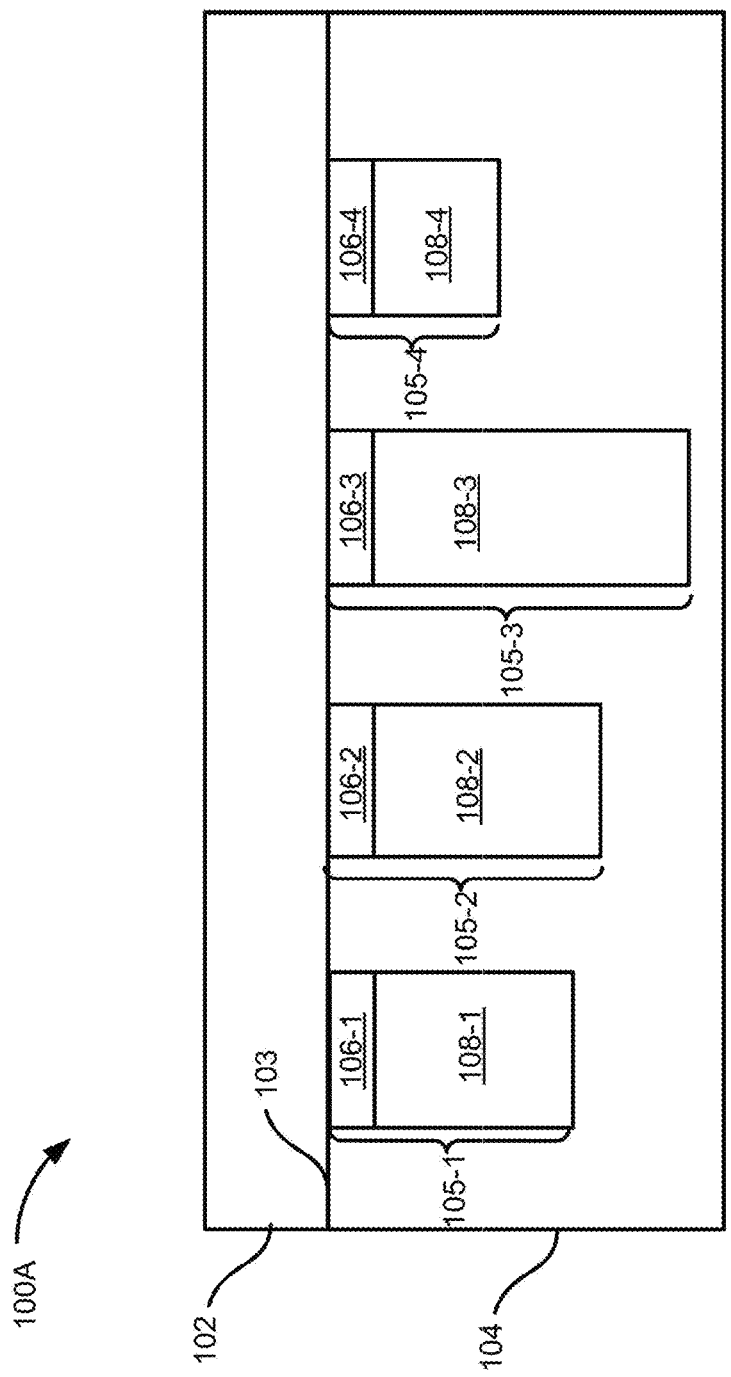
FIG. 1A depicts a cross-section of an example apparatus having thin film filters coupled to an optically transparent block, where the filters are encased in an optical transparent overmold material.

FIG. 1A depicts an example apparatus 100A that may have an optically transparent block 102. The optically transparent block 102 may have a filter surface 103. Coupled to the filter surface 103 may be thin film filters 105, where each thin film filter 105 may include dielectric thin films 106 fabricated on a substrate 108. While the thin films 106 are shown in the example of FIG. 1A to be coupled to the side of the substrates 108 closer to the block 102, the thin films 106 may also be coupled to the opposite side of the substrates 108 farther from the block 102. Each thin film filter 105 may be coupled to the filter surface 103 via the dielectric thin films 106. The block 102 and the substrates 108 may be made from any type of glass that is transparent at the wavelengths of light to be transmitted through the block 102 and the substrates 108, for example, fused silica or borosilicate glass.

In the example of FIG. 1A, four thin film filters 105 are shown, but any number of thin film filters may be used. Each of the thin film filters 105 may be, but is not limited to, a bandpass filter centered at a different wavelength, and each of the thin film filters 105 may be fabricated on a substrate 108 that may have a different thickness from the other substrates 108. Thus, the thickness of substrates 108 may each be different. Additionally, because the center wavelength of the bandpass filter of each thin film filter 105 is different, and the total thickness of the dielectric thin films of a bandpass filter scales with the center wavelength, the thickness of the thin film filters 106 for each of the different thin film filters 105 is different. As a result, the total thickness of the thin film filters 105 may be different.

An optically transparent overmold material 104 may be used to encase the thin film filters 105 such that the volume between neighboring thin film filters, for example 105-1 and 105-2, is filled by the overmold material 104. Examples of a suitable overmold material 104 include Zeonex, a cyclo olefin polymer manufactured by Zeon Chemicals L.P., and Ultem, a polyetherimide manufactured by Saudi Basic Industries Corporation (SABIC).

Figure 1B:
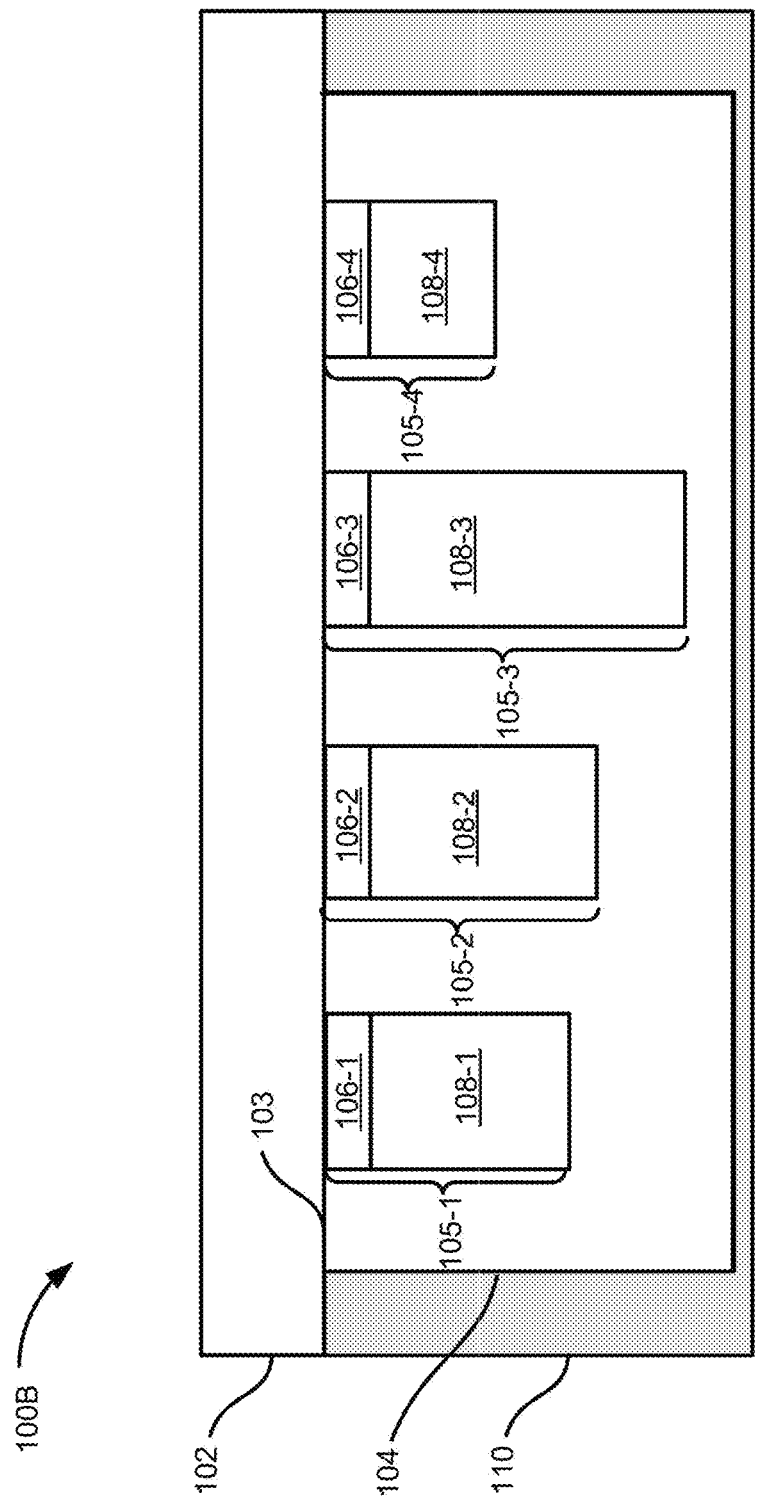
FIG. 1B depicts a cross-section of an example apparatus having thin film filters coupled to an optically transparent block, where the filters are encased in an optical transparent overmold material, and the overmold material is within an optical transparent glass cap.

In some implementations, an optically transparent cap 110 may be used to encapsulate the overmold material, as shown in the example apparatus 100B of FIG. 1B. The cap 110 may be coupled to the filter surface 103 of the optically transparent block 102 such that a cavity is formed between the cap 110 and the block 102, and the thin film filters 105 are within the cavity. Then the overmold material 104 may be used to fill the cavity while in a molten state. Upon cooling of the molten overmold material 104, the thin film filters 105 may be encased in the overmold material 104 within the cavity. The cap 110 may be made from any type of material that transmits light at the wavelengths of interest, such as fused silica or a semiconductor such as silicon. In some implementations, the cap 110 may be made from a plastic that transmits light at the wavelengths of interest and can withstand the temperatures of the molten overmold material 104. In some implementations, the cap 110 may include alignment features to mate with complementary features (described further below) on a substrate (not shown), such as a printed circuit board, or complementary features on an optical socket coupled to the substrate.

Figure 2:
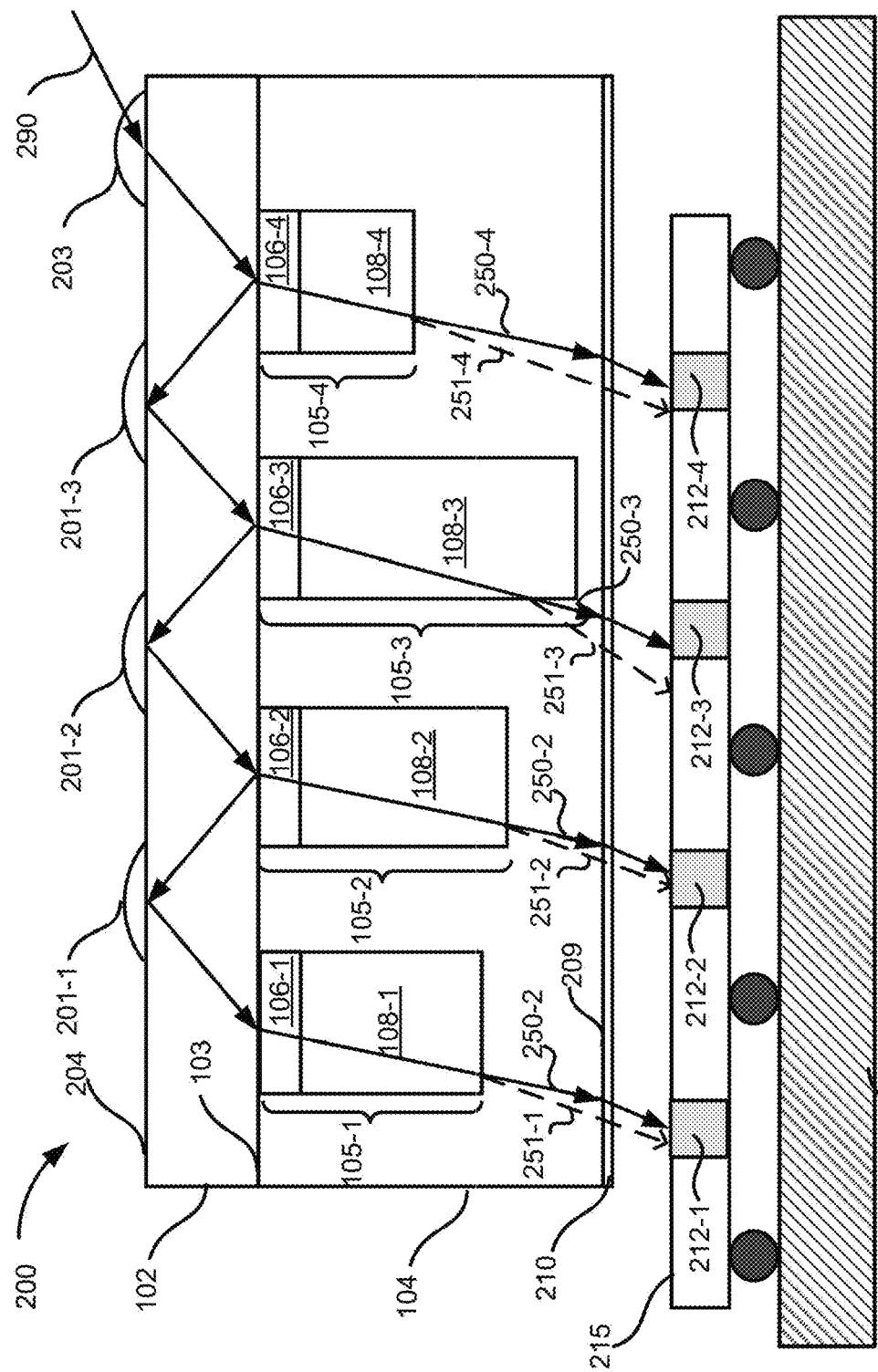
FIG. 2 depicts a cross-section of an example demultiplexer system that includes overmolded thin film filters.

FIG. 2 depicts a cross-section of an example demultiplexer system 200 that includes overmolded thin film filters 105. A multi-wavelength light beam 290 may enter the optically transparent block 102 of the demultiplexer system 200 through, but is not limited to, a lens 203 coupled to a first surface 204 of the block 102. The lens 203 collimates the light beam 290. The multi-wavelength light beam 290 may be demultiplexed by the system 200, and the demultiplexed beams may be detected by detectors 212 coupled to a substrate 220, such as a printed circuit board, where the detectors may be flip chipped onto the substrate 220. The detectors may be any type of sensor capable of sensing the system operating wavelengths, such as a photodiode. The example of FIG. 2 shows that the multi-wavelength light beam is demultiplexed into four beams and detected by four detectors; however, the multi-wavelength light beam may be demultiplexed into any number of beams and detected by any number of detectors.

In the example system of FIG. 2, the multi-wavelength light beam 290 entering system 200 may impinge on the thin film filter 106-4 coupled to the filter surface 103 of the block 102. The thin film filter 106-4 may transmit light at or near a first wavelength λ1 and reflect all other wavelengths toward a reflective focuser 201-3 coupled to the first surface 204 of the block 102. The reflective focusers 201 re-collimate the light beam as it zig-zags through the block 102. Light at or near the first wavelength λ1 continues traveling through the optically transparent substrate 108-4 and then enters the overmold material 104 before encountering an anti-reflection coating 210 on an exit surface 209 of the overmold material 104. The exiting light is sensed by detector 212-4.

When the refractive index of the overmold material 104 is matched to the refractive index of the substrate 108-4, or is within a predetermined range of the refractive index of the substrate 108-4 of the thin film filter 105-4, the light exiting the substrate 108-4 follows the path or near the path 250-4 to arrive at the detector 212-4. However, if the overmold material 104 were not present, so that the refractive index difference between the substrate 108-4 and air is greater than the predetermined range, the light exiting the substrate 108-4 may follow the dotted path 251-4, where the beam is refracted upon exiting the substrate 108-4 and walks off so that the light misses the active area of the detector 212-4 and is not detected.

Returning to the light reflected by the reflective focuser 201-3, the reflected light is focused onto thin film filter 106-3. Thin film filter 106-3 may transmit light at or near a second wavelength λ2 and reflect all other wavelengths toward a reflective focuser 201-2 coupled to the first surface 204 of the block 102. Light at or near the second wavelength λ2 continues traveling through the optically transparent substrate 108-3 and then enters the overmold material 104 before encountering the anti-reflection coating 210 on the exit surface 209 of the overmold material 104. The exiting light is sensed by detector 212-3.

When the refractive index of the overmold material 104 is matched to the refractive index of the substrate 108-3, or is within a predetermined range of the refractive index of the substrate 108-3 of the thin film filter 105-3, the light exiting the substrate 108-3 follows the path or near the path 250-3 to arrive at the detector 212-3. However, if the overmold material 104 were not present, the light exiting the substrate 108-3 follows the dotted path 251-3, where the beam is refracted upon exiting the substrate 108-4 and walks off so that the light misses the active area of the detector 212-3 and is not detected. Additionally, the light exits the sidewall of substrate 108-3 which may be rough, resulting in unwanted scattering and reflection loss.

Returning to the light reflected by the reflective focuser 201-2, the reflected light is focused onto thin film filter 106-2. Thin film filter 106-2 may transmit light at or near a third wavelength λ3 and reflect all other wavelengths toward a reflective focuser 201-1 coupled to the first surface 204 of the block 102. Light at or near the third wavelength λ3 continues traveling through the optically transparent substrate 108-2 and then enters the overmold material 104 before encountering the anti-reflection coating 210 on the exit surface 209 of the overmold material 104. The exiting light is sensed by detector 212-2.

Light reflected by the reflective focuser 201-1 is focused onto thin film filter 106-1. Thin film filter 106-1 may transmit light at or near a fourth wavelength λ4. In some implementations, the thin film filter 106-1 may transmit all wavelengths except those near wavelengths λ1, λ2, and λ3. Light transmitted by thin film filter 106-1 continues through the optically transparent substrate 108-1 and enters the overmold material 104 before encountering the anti-reflection coating 210 on the exit surface 209 of the overmold material 104. The exiting light is sensed by detector 212-1.

When the refractive index of the overmold material 104 is matched to the refractive index of the substrates 108-2 and 108-1, or is within a predetermined range of the refractive index of the substrates 108-2 and 108-1 of the thin film filters 105-2 and 105-1, the light exiting substrate 108-2 and 108-1 follow the paths 250-2 and 250-1, respectively. If the overmold material 104 were not present, the light exiting the substrates 108-2 and 108-1 is refracted to follow the dotted paths 251-2 and 251-1, respectively. The thickness of the substrates 108-2 and 108-1 are within range of specifications for the system and result in the light being detected by detectors 212-2 and 212-1, respectively.

Figure 3:
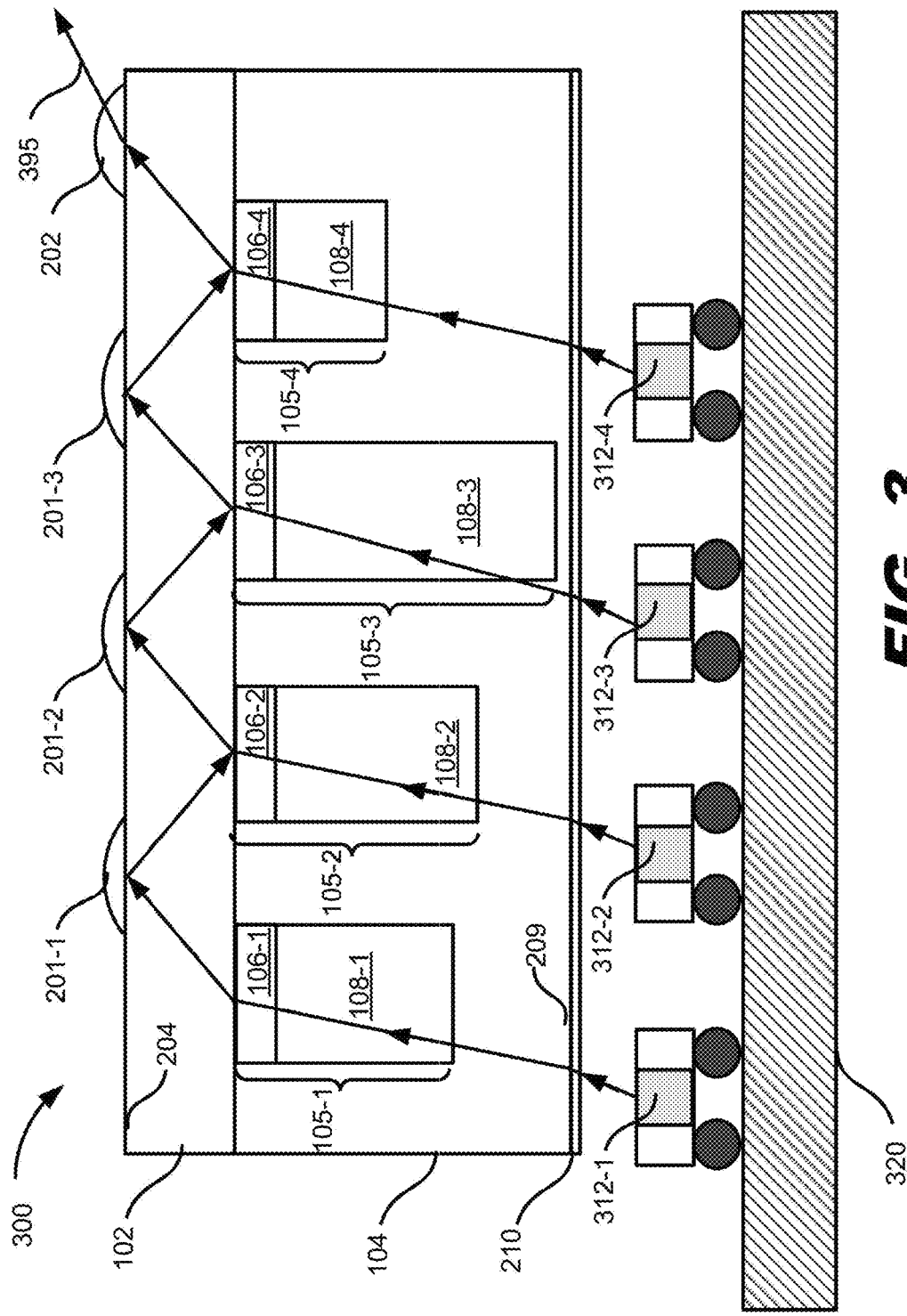
FIG. 3 depicts a cross-section of an example multiplexer system that includes overmolded thin film filters.

FIG. 3 depicts a cross-section of an example multiplexer system 300 that includes overmolded thin film filters. Coupled to the block 102 on surface 204 are reflective focusers 201 that operate in a similar manner as in the demultiplexer system 200, reflecting and focusing light impinging on the reflective focuser 201. Lens 202 coupled to surface 204 focuses the multiplexed beam 395 exiting the multiplexing system 300. The thin film filters 105 operate in a similar manner as described above, each transmitting light at or near a different wavelength and reflecting other wavelengths.

Optical sources 312 are coupled to a substrate 320, such as a printed circuit board. The optical sources 312 each emit light at different wavelengths and can be, for example, vertical-cavity surface-emitting lasers (VCSEL). The light from the optical sources 312 enters the overmold material 104 through the anti-reflection coating 210 on the surface 209 of the overmold material 104. When the refractive index of the overmold material 104 is matched to the refractive index of the substrates 108 of the thin film filters 105, or is within a predetermined range of the refractive index of the substrates 108, the light follows the path shown and exits as a multiplexed light beam 395. However, if the overmold material 104 were not present, so that the refractive index difference between the substrate 108-4 and air is greater than the predetermined range, the light that is transmitted by thin films 106-3 and 106-4 would miss the reflective focuser 201-3 and the lens 203, respectively. As a result, there would be large losses for these light beams in the multiplexed beam 395.

Figure 4:
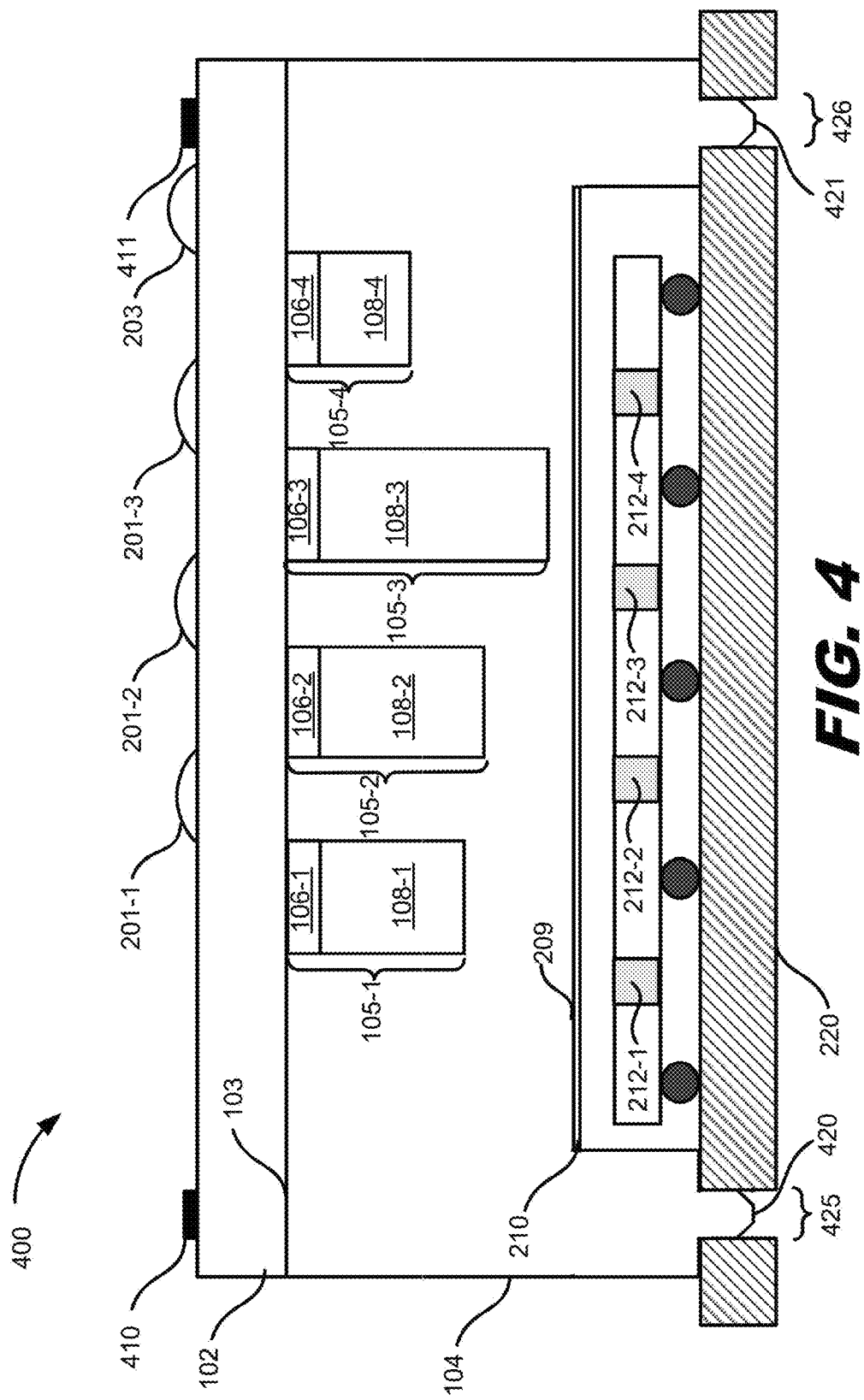
FIG. 4 depicts a cross-section of an example system that has molded mechanical alignment features and standoffs.

FIG. 4 depicts a cross-section of an example system 400 that has standoffs/pins 420, 421 and mechanical alignment features 410, 411. The printed circuit board 220 may have holes 425, 426 to receive the standoffs/pins 420, 421. The standoffs/pins 420, 421 and the holes 425, 426 may be used to passively align the optical block 102 and coupled overmolded filters 105 relative to the optoelectronics 212 coupled to the printed circuit board 220 in a plane parallel to the filter surface 103. For a multiplexing system, the optoelectronics 212 may be detectors, while for a demultiplexing system, the optoelectronics 212 may be optical sources. The optoelectronics may incorporate integrated lenses to collimate light, in the case of a light source such as a VCSEL, or focus light entering a photodetector. If the overmolded filters 105 are not aligned to the optoelectronics 212, the multiplexing or demultiplexing system does not perform the multiplexing or demultiplexing function, or the system operates with higher losses than for the case when the filters 105 are not misaligned.

In some implementations, the standoffs/pins 420, 421 may be fabricated as part of the overmold material 104 that encases the filters 105, where the mold used for positioning the overmold material 104 includes the standoff/pin features. In some implementations, the standoffs/pins 420, 421 may be created using a separate overmold process on top of an initially positioned overmold material 104 for encasing the filters 105.

The alignment features 410, 411 may be blocks or any other suitable shape used to align a mold used for positioning the overmold material 104 and/or a separate mold for the standoffs/pins 420, 421. The alignment features 410, 411 may be made from, for example, gold, or other material, or etched into the block 102.

In some implementations, the alignment features 410, 411 and/or standoffs 420, 421 may be fabricated by microelectromechanical (MEMS) fabrication techniques, such as photolithography, electroplating, or etching.

Additionally, the standoffs/pins 420, 421 may be used to fix the distance between the optoelectronics 212 and the filters 105, because there is a specific distance over which the light is collimated by the reflective focusers 201 and lens 203. If the thin films 106 are too far from the optoelectronics 212, the light may diffract too much before hitting the detectors in the case of a demultiplexing system, or in the case of a multiplexing system, the light may diffract too much before hitting the reflective focusers 201 and lens 203, resulting in excess losses.

In the designs of the systems depicted in FIGS. 2-5, light enters or exits the optoelectronics (detectors 212 or optical sources 312) at an angle to an entrance surface or exit surface, respectively, of the optoelectronics. However, in some configurations, the light may enter or exit the optoelectronics perpendicular to the entrance surface or exit surface, respectively. Then a mechanism may be used to tilt the light beams exiting or entering the molded material 104. For example, in some implementations, standoffs on the surface 210 of the molded material 104 away from the block 102 may be molded to tilt the overmolded material 104 relative to the substrate 220. In other implementations, the surface 210 may be molded at an angle with respect to the surface 103 of the molded material 104 closest to the block 102. In other implementations, small prisms may be molded on the surface 210 of the molded material 104.

Figure 5:
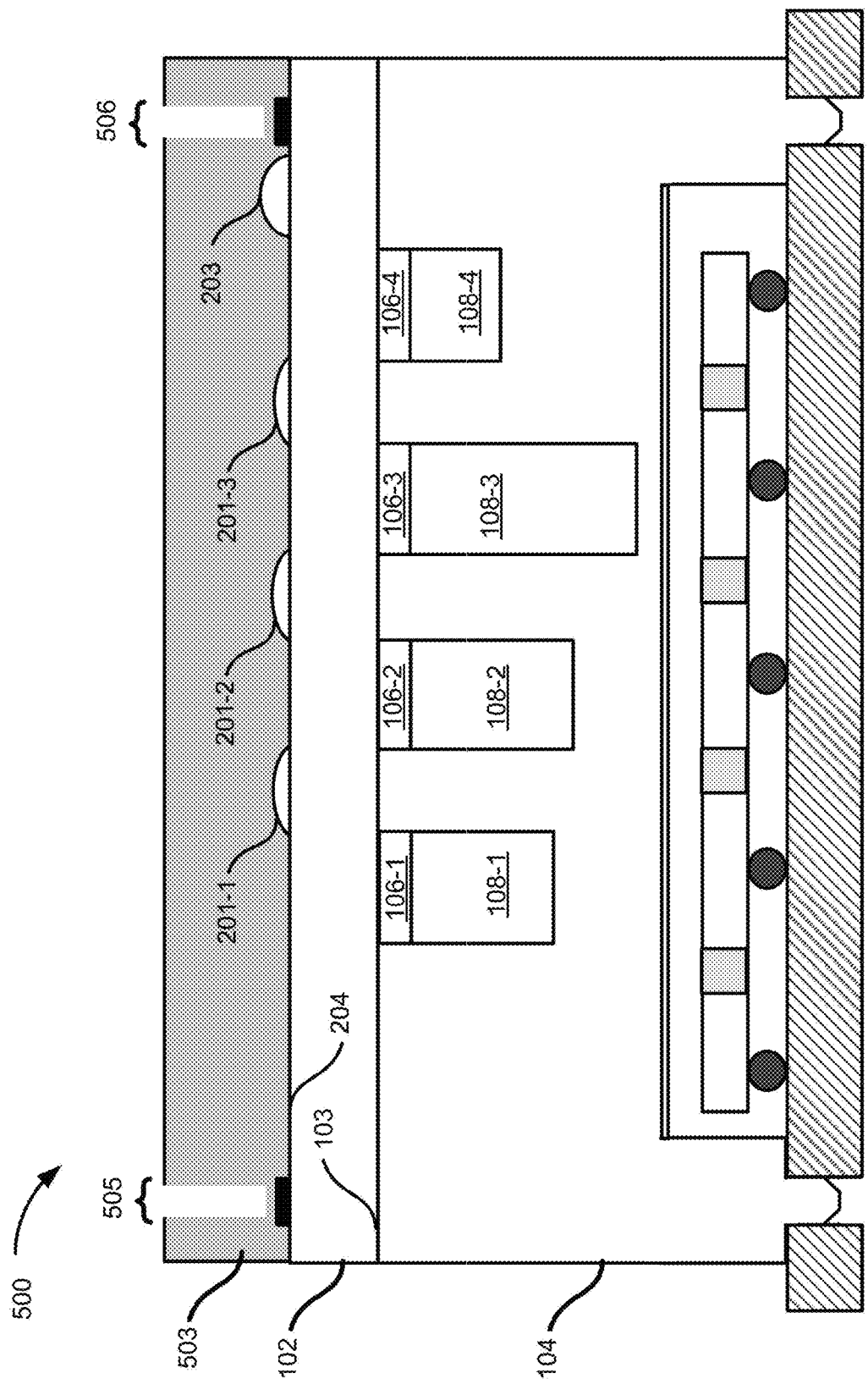
FIG. 5 depicts a cross-section of an example system that has overmolded features to mate to complementary features of an optical connector.

FIG. 5 depicts a cross-section of an example system 500 that has mating features 505, 506 to mate to complementary features of an optical connector (not shown). The optical connector may receive a multiplexed beam when the system 500 operates as a multiplexing system or may provide a multi-wavelength beam to the system 500 when it operates as a demultiplexing system.

In some implementations, the mating features 505, 506 may be holes in an overmold material 503 coupled to a surface 204 of the block 102 opposite the filter surface 103. Alternatively, the mating features 505, 506 may be formed using MEMS fabrication techniques, such as photolithography, electroplating, or etching.

Figure 6:
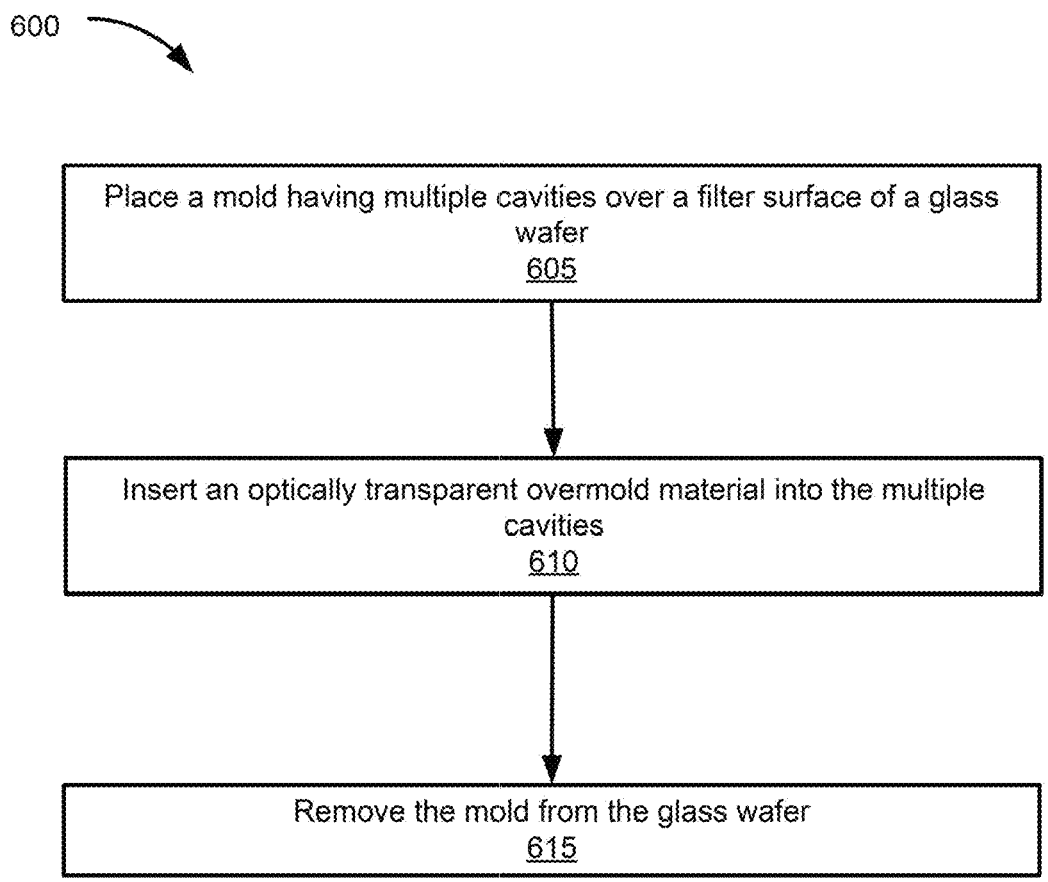
FIG. 6 depicts a flow diagram illustrating an example process of manufacturing overmolded thin film filters.

FIG. 6 depicts a flow diagram illustrating an example process 600 of manufacturing overmolded thin film filters. The process begins at block 605, where a mold having multiple cavities may be placed over a filter surface of a glass wafer. Multiple sets of thin film filters may be coupled to the filter surface, and each set of the multiple sets of thin film filters may be enclosed by a different one of the multiple cavities. Coupled to a surface of the glass wafer opposite the filter surface may be multiple sets of reflective focusers and lenses, where each of the multiple sets of reflective focusers and lenses corresponds to one of the multiple sets of thin film filters, such that multiple multiplexing or demultiplexing systems are fabricated at the wafer level.

At block 610, an optically transparent overmold material may be inserted into the multiple cavities. For example, a molten overmold material may be injected to fill the multiple cavities.

After the molten overmold material has cooled, at block 615, the mold may be removed from the glass wafer, leaving the solidified overmold material encasing the multiple sets of thin film filters.

Figure 7:
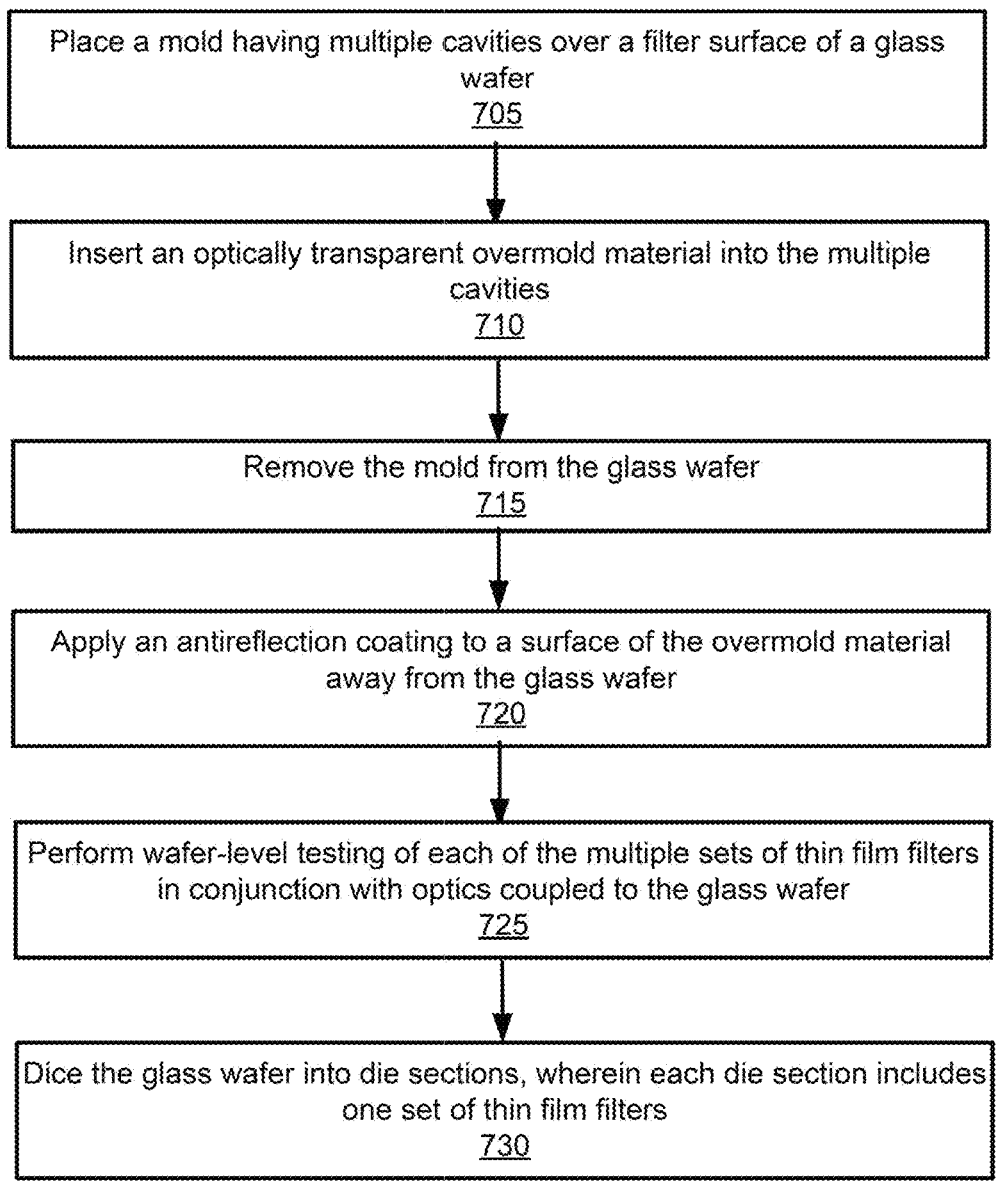
FIG. 7 depicts a flow diagram illustrating an example process of performing wafer-level testing on a multiplexing or demultiplexing system that has overmolded thin film filters.

FIG. 7 depicts a flow diagram illustrating an example process 700 of performing wafer-level testing on a multiplexing or demultiplexing system that has overmolded thin film filters.

The process begins at block 705, which may be similar to block 605 described with respect to process 600 of FIG. 6. Blocks 710 and 715 may also be similar to blocks 610 and 615, respectively, of FIG. 6.

At block 720, an anti-reflection coating may be applied to a surface of the overmold material away from the glass wafer. The anti-reflection coating should be effective over the range of wavelengths for which the multiplexing or demultiplexing system is to be used.

At block 725, wafer-level testing of each of the multiple sets of thin film filters may be performed in conjunction with optics coupled to the glass wafer. For example, a set of thin film filters may be part of a multiplexing system, and the multiplexing functions of each multiplexing system may be tested. Alternatively, a set of thin film filters may be part of a demultiplexing system, and the demultiplexing functions of each demultiplexing system may be tested. The wafer-level testing of the multiplexing and demultiplexing systems may be automated.

At block 730, the glass wafer may be diced into die sections. Each die section includes one set of thin film filters that may be part of a multiplexing or demultiplexing system.

Figure 8:
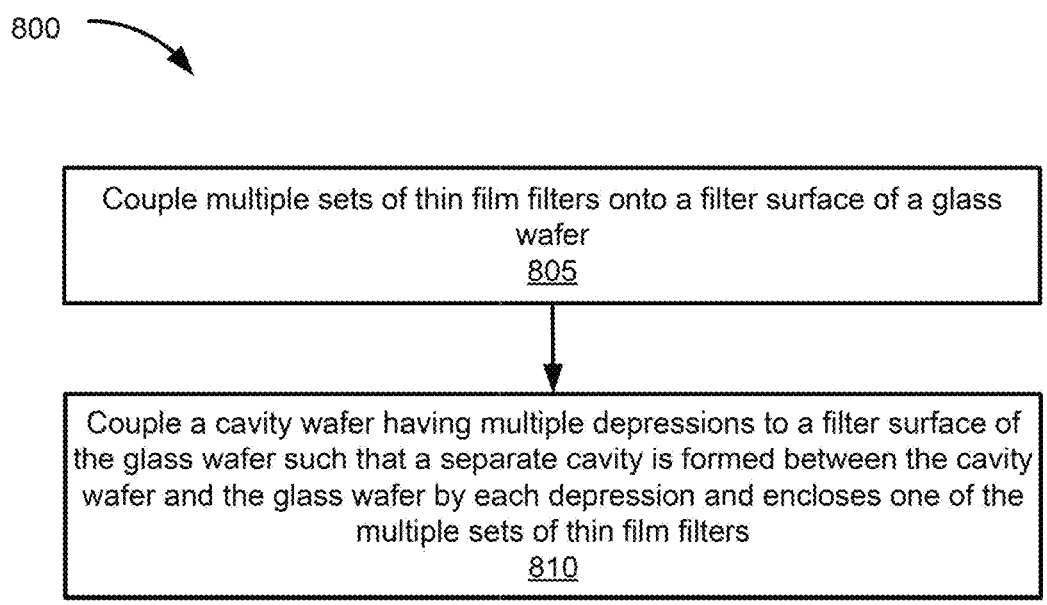
FIG. 8 depicts a flow diagram illustrating an example process of using an optically transparent cap to produce overmolded thin film filters for a multiplexing or demultiplexing system.

FIG. 8 depicts a flow diagram illustrating an example process 800 of using an optically transparent cap to produce overmolded thin film filters for a multiplexing or demultiplexing system.

The process begins at block 805, where multiple sets of thin film filters may be coupled onto a filter surface of a glass wafer. Each set of thin film filters may be part of a multiplexing or demultiplexing system that includes reflective focusers and lenses coupled to a surface of the glass wafer opposite the filter surface.

At block 810, an optically transparent cavity wafer having multiple depressions may be coupled to a filter surface of the glass wafer such that a separate cavity is formed between the cavity wafer and the glass wafer by each depression and encloses one of the multiple sets of thin film filters.

Figure 9:
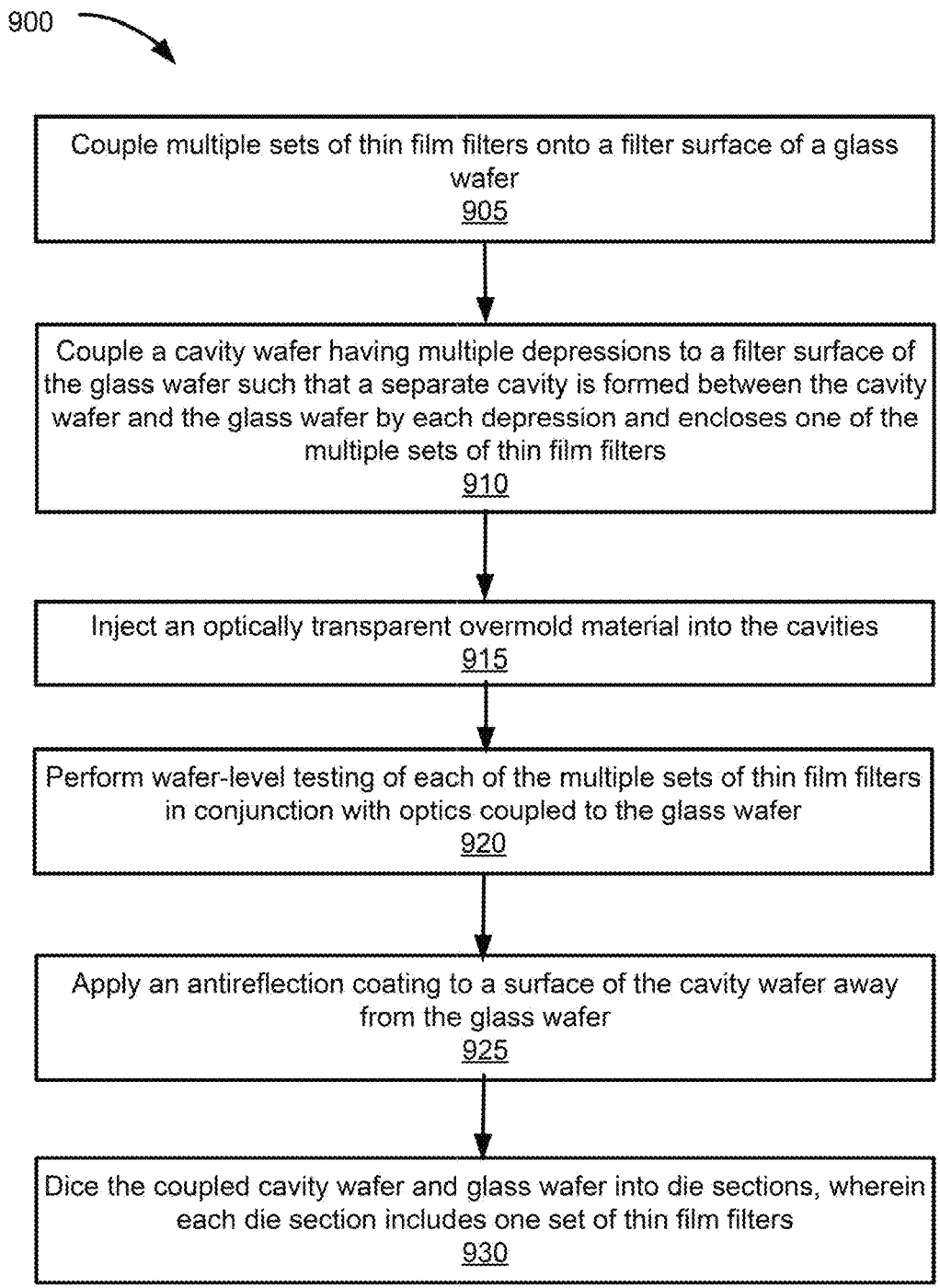
FIG. 9 depicts a flow diagram illustrating an example process of using an optically transparent cap to produce overmolded thin film filters for a multiplexing or demultiplexing system and performing wafer-level testing on the system.

FIG. 9 depicts a flow diagram illustrating an example process 900 of using an optically transparent cap to produce overmolded thin film filters for a multiplexing or demultiplexing system and performing wafer-level testing on the system.

The process begins at block 905, which may be similar to block 805 described with respect to the process 800 of FIG. 8. Block 910 may also be similar to block 810 of FIG. 8.

At block 915, a molten, optically transparent overmold material may be injected into the cavities formed between the cavity wafer and the glass wafer. Block 920 may be similar to block 725 of FIG. 7.

At block 925, an anti-reflection coating may be applied to a surface of the cavity wafer away from the glass wafer. The anti-reflection coating should be effective over the range of wavelengths for which the multiplexing or demultiplexing system is to be used.

At block 930, the coupled cavity wafer and glass wafer may be diced into die sections, where each die section includes one set of thin film filter, and each set of thin film filters may be part of a multiplexing or demultiplexing system.

Figure 10:
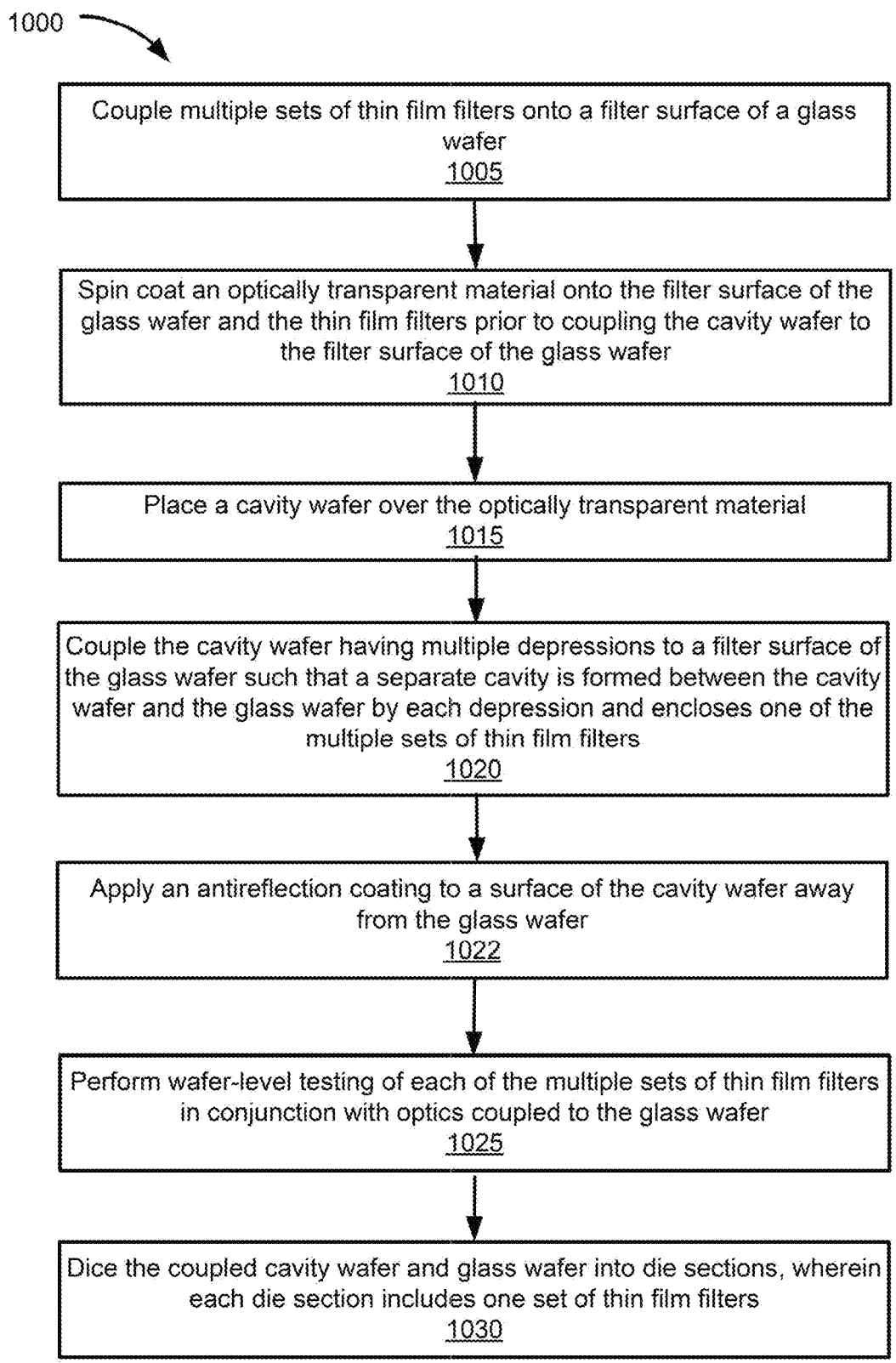
FIG. 10 depicts a flow diagram illustrating an example process of using an optically transparent cap to produce overmolded thin film filters for a multiplexing or demultiplexing system and performing wafer-level testing on the system.

FIG. 10 depicts a flow diagram illustrating an example process 1000 of using an optically transparent cap to produce overmolded thin film filters for a multiplexing or demultiplexing system and performing wafer-level testing on the system.

The process begins at block 1005, which may be similar to block 805 described with respect to the process 800 of FIG. 8.

At block 1010, an optically transparent material may be spun onto the filter surface of the glass wafer and the thin film filters to coat the filter surface and the thin film filters.

At block 1015, a cavity wafer having multiple depressions may be placed over the spin-coated optically transparent material.

At block 1020, the cavity wafer may be coupled to a filter surface of the glass wafer such that a separate cavity is formed between the cavity wafer and the glass wafer by each depression and encloses one of the multiple sets of thin film filters. Each set of thin film filters may be part of a multiplexing or demultiplexing system that includes reflective focusers and lenses coupled to a surface of the glass wafer opposite the filter surface. Block 1022 may be similar to block 720 of FIG. 7. Block 1025 may be similar to block 725 of FIG. 7.

At block 1030, the coupled cavity wafer and glass wafer may be diced into die sections, where each die section includes one set of thin film filters, and each set of thin film filters may be part of a multiplexing or demultiplexing system.

Not all of the steps, or features presented above are used in each implementation of the presented techniques.

As used in the specification and claims herein, the singular forms "a," "an," and "the" include plural referents unless the context clearly dictates otherwise.

What is claimed is:

1. An apparatus comprising:
an optically transparent block having a filter surface;
two or more filters, wherein each of the filters comprises thin films fabricated on an optically transparent substrate, and further wherein the thin films of the filters are coupled, directly or indirectly, to the filter surface; and
an optically transparent overmold material encasing the two or more filters, wherein the overmold material fills a volume between and above neighboring ones of the two or more filters, wherein the optically transparent overmold material is configured to receive light entering therethrough from the optically transparent substrate.

2. The apparatus of claim 1, wherein a refractive index of the overmold material is within a predetermined range of a refractive index of the substrates of the two or more filters.

3. The apparatus of claim 1, wherein the overmold material has a first surface and a second surface, wherein the first surface contacts the filter surface of the block, and the second surface is away from the filter surface, wherein the second surface is molded to direct light entering or exiting the overmold material at a particular angle, and further wherein the apparatus further comprises an anti-reflection coating on the second surface.

4. The apparatus of claim 1, further comprising alignment features coupled to the overmold material to position the two or more filters in a first direction perpendicular to the filter surface and in a second direction perpendicular to the first direction.

5. The apparatus of claim 4, wherein the alignment features are part of the overmold material extending beyond the second surface, or are fabricated by photolithography, electroplating on the overmold material, or etching of the overmold material.

6. The apparatus of claim 1, further comprising an optically transparent cap coupled to the filter surface of the block such that a cavity is formed between the cap and the block, wherein the overmold material fills the cavity and the two or more filters are encased by the overmold material within the cavity.

7. The apparatus of claim 6, wherein a surface of the cap away from the block includes alignment features to mate to corresponding complementary features on a substrate or an element coupled to the substrate to position the two or more filters in a first direction perpendicular to the filter surface and in a second direction perpendicular to the first direction.

8. The apparatus of claim 1, wherein mating features are coupled to a surface of the block opposite the filter surface to mate to corresponding complementary features on an optical connector.

9. A method comprising:
placing a mold having multiple cavities over a filter surface of a glass wafer, wherein multiple sets of thin film filters are coupled to the filter surface, and further wherein each set of the multiple sets of thin film filters is enclosed by a different one of the multiple cavities;
inserting an optically transparent overmold material into the multiple cavities, wherein the optically transparent overmold material is configured to receive light entering therethrough via the filter surface of the glass wafer; and
removing the mold from the glass wafer.

10. The method of claim 9, further comprising:
applying an anti-reflection coating to a surface of the overmold material away from the glass wafer.

11. The method of claim 10, further comprising:
performing wafer-level testing of each of the multiple sets of thin film filters in conjunction with optics coupled to the glass wafer; and
dicing the glass wafer into die sections, wherein each die section includes one set of thin film filters.

12. A method comprising:
coupling multiple sets of thin film filters onto a filter surface of a glass wafer;
coupling a cavity wafer having multiple depressions to a filter surface of the glass wafer such that a separate cavity is formed between the cavity wafer and the glass wafer by each depression and encloses one of the multiple sets of thin film filters; and
injecting an optically transparent overmold material into the cavities, wherein the optically transparent overmold material is configured to receive light entering therethrough via the filter surface of the glass wafer.

13. The method of claim 12, further comprising:
applying an anti-reflection coating to a surface of the cavity wafer away from the glass wafer; and
performing wafer-level testing of each of the multiple sets of thin film filters in conjunction with optics coupled to the glass wafer.

14. The method of claim 13, further comprising:
dicing the coupled cavity wafer and glass wafer into die sections, wherein each die section includes one set of thin film filters.

15. The method of claim 12, further comprising:
prior to coupling the cavity wafer to the filter surface of the glass wafer, spin coating an optically transparent material onto the filter surface of the glass wafer and the thin film filters prior to coupling the cavity wafer to the filter surface of the glass wafer;
placing the cavity wafer over the optically transparent material prior to coupling the cavity wafer to the filter surface of the glass wafer;
applying an anti-reflection coating to a surface of the cavity wafer away from the glass wafer;
performing wafer-level testing of each of the multiple sets of thin film filters in conjunction with optics coupled to the glass wafer; and
dicing the coupled cavity wafer and glass wafer into die sections, wherein each die section includes one set of thin film filters.

* * * * *